United States Patent
Muldoon et al.

(10) Patent No.: US 10,099,702 B2
(45) Date of Patent: Oct. 16, 2018

(54) METHOD AND APPARATUS FOR VEHICLE ACCESSORY AND LOAD MANAGEMENT

(71) Applicant: GM GLOBAL TECHNOLOGY OPERATIONS LLC, Detroit, MI (US)

(72) Inventors: Steven E. Muldoon, Royal Oak, MI (US); Dongxu Li, Troy, MI (US); Yiran Hu, Shelby Township, MI (US); Jun-mo Kang, Ann Arbor, MI (US); Chen-fang Chang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 15/247,252

(22) Filed: Aug. 25, 2016

(65) Prior Publication Data

US 2018/0057004 A1 Mar. 1, 2018

(51) Int. Cl.
*B60W 50/00* (2006.01)
*B60W 10/06* (2006.01)
*B60W 10/30* (2006.01)
*B60W 30/182* (2012.01)
*B60W 30/188* (2012.01)

(52) U.S. Cl.
CPC ........ *B60W 50/0097* (2013.01); *B60W 10/06* (2013.01); *B60W 10/30* (2013.01); *B60W 30/182* (2013.01); *B60W 30/1886* (2013.01); *B60W 2510/305* (2013.01); *B60W 2550/143* (2013.01); *B60W 2550/402* (2013.01); *B60W 2550/406* (2013.01); *B60W 2550/408* (2013.01); *B60W 2710/0666* (2013.01); *B60W 2710/305* (2013.01); *B60W 2720/30* (2013.01)

(58) Field of Classification Search
CPC .................................................. B60W 50/0097
USPC ........................................................... 701/36
See application file for complete search history.

(56) References Cited

U.S. PATENT DOCUMENTS

| | | | |
|---|---|---|---|
| 5,897,600 A * | 4/1999 | Elmore ................ | A01C 17/006 172/4.5 |
| 7,404,784 B2 * | 7/2008 | De Mersseman ..... | B60W 10/06 477/200 |
| 7,676,062 B2 * | 3/2010 | Breed ............... | B60R 21/01552 382/100 |

(Continued)

*Primary Examiner* — Jean Paul Cass
(74) *Attorney, Agent, or Firm* — Quinn IP Law (57) ABSTRACT

A vehicle is described, and includes a drivetrain system including an internal combustion engine and a geartrain, an accessory device, and a route monitoring system. A controller includes an instruction set to monitor operation of the accessory device, and a request to operate the accessory device. When the request to operate the accessory device includes a request to activate the accessory device based upon not exceeding a limit for an operating parameter of the accessory device, the instruction set executes to determine a horizon for the vehicle based upon the projected path for the vehicle, determine a projected road load and a speed constraint based upon the horizon for the vehicle, and determine a projected axle torque command based upon the projected road load. A first routine determines a first command for operating the accessory device that minimizes fuel consumption and meets the projected axle torque command.

19 Claims, 2 Drawing Sheets

(56) References Cited

U.S. PATENT DOCUMENTS

| | | | | |
|---|---|---|---|---|
| 7,702,432 B2* | 4/2010 | Bandai | ............... | B60T 1/10 |
| | | | | 180/65.1 |
| 7,853,401 B2* | 12/2010 | Hoetzer | ............ | B60K 31/0008 |
| | | | | 701/112 |
| 8,155,868 B1* | 4/2012 | Xing | ............... | G07C 5/0808 |
| | | | | 340/439 |
| 8,560,254 B2* | 10/2013 | Newhouse | ........... | B60R 16/023 |
| | | | | 324/537 |
| 8,766,787 B2* | 7/2014 | Yu | ..................... | B60W 50/14 |
| | | | | 123/179.3 |
| 9,145,864 B2* | 9/2015 | Kristinsson | ........ | F02N 11/0837 |
| 9,199,648 B2* | 12/2015 | Bar | ................ | B60W 30/18154 |
| 9,644,592 B2* | 5/2017 | Nishina | ............... | F02D 28/00 |
| 9,809,169 B1* | 11/2017 | Naboulsi | ............. | B60R 1/025 |
| 2008/0029320 A1* | 2/2008 | Fleckner | .............. | B60K 6/48 |
| | | | | 180/65.265 |
| 2009/0300595 A1* | 12/2009 | Moran | .................. | G06F 8/65 |
| | | | | 717/170 |
| 2016/0264126 A1* | 9/2016 | Ketfi-Cherif | .......... | B60L 1/003 |
| 2017/0305349 A1* | 10/2017 | Naboulsi | ............. | B60R 1/04 |

\* cited by examiner

METHOD AND APPARATUS FOR VEHICLE ACCESSORY AND LOAD MANAGEMENT

TECHNICAL FIELD

The disclosure relates to control and operation of vehicle operating systems, including operation of accessories and engine load management.

BACKGROUND

Many currently available automotive powertrain controllers are reactive in that they utilize local sensory information to control operation of various on-vehicle power consuming devices without regard for upcoming changes in vehicle operation that may be necessary in response to changes in road conditions, traffic conditions and other factors.

All vehicles, including internal combustion vehicles (ICVs), hybrid electric vehicles (HEVs), plug-in hybrid electric vehicles (PHEVs), and battery electric vehicles (BEVs) may benefit from connectivity-enabled efficiency optimization to reduce fuel consumption.

SUMMARY

A vehicle is described, and includes a drivetrain system including an internal combustion engine and a geartrain, wherein the geartrain is disposed to transfer power originating from the internal combustion engine to vehicle wheels. An accessory device is disposed to transform power originating from the drivetrain, and a route monitoring system is disposed to monitor a projected path for the vehicle. A controller is in communication with the powertrain system, the accessory device and the route monitoring system, and includes a processor and memory including an instruction set. The instruction set is executable to monitor a parameter associated with operation of the accessory device, and monitor a request to operate the accessory device. When the request to operate the accessory device includes a request to activate the accessory device based upon not exceeding a limit for the parameter that is associated with the operation of the accessory device, the instruction set executes to determine a horizon for the vehicle based upon the projected path for the vehicle, determine a projected road load and a speed constraint based upon the horizon for the vehicle, and determine a projected axle torque command based upon the projected road load and the speed constraint. A first routine is executed to determine a first command for operating the accessory device, wherein the first command for operating the accessory device is determined to minimize fuel consumption and meet the projected axle torque command.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as up, over, above, below, beneath, rear and front may be used with respect to the drawings. These and similar directional terms are not to be construed to limit the scope of the disclosure in any manner. Furthermore, the disclosure, as illustrated and described herein, may be practiced in the absence of any element which is not specifically disclosed herein.

Figure 1:
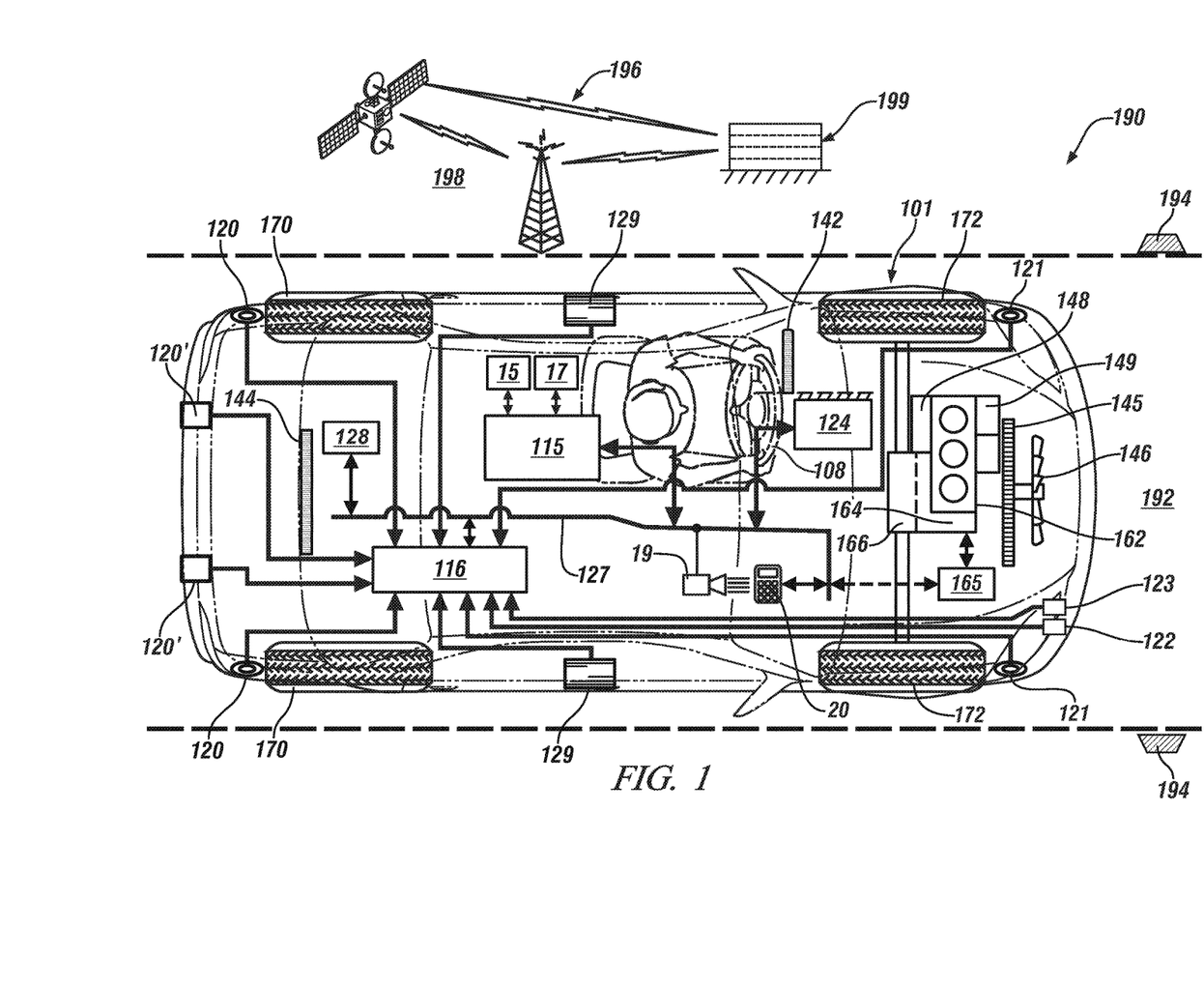
FIG. 1 is a schematic plan view of a vehicle including an extra-vehicle monitoring system that is disposed on a roadway, in accordance with the disclosure.

Referring now to the drawings, wherein the showings are for the purpose of illustrating certain exemplary embodiments only and not for the purpose of limiting the same, FIG. 1 schematically shows a vehicle 101 that is disposed on a roadway 192, wherein the roadway 192 may include a plurality of sensors 194 and other markers that may be in communication with an intelligent vehicle highway system (IVHS) 190. The illustrated vehicle 101 includes a four-wheel passenger vehicle with steerable front wheels 172 and fixed rear wheels 170, although the concepts described herein are not so limited. The vehicle 101 may include, but not be limited to any mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The vehicle 101 includes a drivetrain 160, a spatial monitoring system 116, a vehicle monitoring system 115, and a communication controller 19. Operation of the vehicle 101 may be controlled by a powertrain control module (PCM) 165, a vehicle control module (VCM) 128, and other suitable controllers. The spatial monitoring system 116, vehicle monitoring system 115, PCM 165, VCM 128 and communication controller 19 preferably communicate therebetween using a high-speed local area network communication bus 127. The spatial monitoring system 116, vehicle monitoring system 115, PCM 165, and VCM 128 of the vehicle 101 are shown as discrete elements for ease of description. It should be appreciated that the functions described and performed by the discrete elements may be executed using one or more devices that may include algorithmic code, predetermined calibrations, hardware, application-specific integrated circuitry (ASIC), and/or off-board or cloud-based computing systems.

The drivetrain system 160 is schematically shown, and includes an internal combustion engine (engine) 162 that is mechanically coupled to a geartrain 164, and the geartrain 164 is mechanically coupled to a driveline 166 to transfer torque to the front wheels 172. In one embodiment, an electrically-powered torque machine (not shown) is disposed to transfer torque to the engine 162 and/or the geartrain 164. Accessory devices that may be powered by the drivetrain system 160 include, by way of non-limiting examples, an air conditioning compressor 148 that may be rotatably coupled to the engine 162 and operatively controlled by the VCM 128, or, alternatively, by the PCM 165. In one embodiment, the air conditioning compressor 148 may be an electrically-powered device. A radiator 145 is disposed to remove heat from the engine 162, and an electrically-powered radiator fan 146 may be disposed to effect heat rejection through the radiator 145. The radiator fan 146 is operatively controlled by the VCM 128, or, alternatively, by the PCM 165. Other electrically-powered accessory devices that are operatively controlled by the VCM 128, or, alternatively, by the PCM 165, include, by way of non-limiting examples, a front windshield heater 142, a rear window heater 144, and a PTC (positive-temperature coefficient) heater that is disposed to supply heated air to a passenger compartment of the vehicle 101. In addition, an electrical alternator/generator 149 is rotatably coupled to the engine 162 to generate and supply electric power to the vehicle 101. Other electrically-powered devices may include, by way of non-limiting examples, a coolant pump, a transmission fluid pump, and passenger seat heating elements, among others.

The engine 162 is preferably configured as a multi-cylinder internal combustion engine that converts fuel to mechanical torque through a thermodynamic combustion process. The engine 162 is equipped with a plurality of actuators and sensing devices for monitoring operation and delivering fuel to form in-cylinder combustion charges that generate an expansion force onto pistons, with such force transferred to a crankshaft to produce torque. The engine 162 is preferably mechanized with suitable hardware and the PCM 165 preferably includes suitable control routines to execute engine stop-start functions, fueled and fuel cutoff (FCO) functions, and all-cylinder and cylinder deactivation functions during ongoing operation of the drivetrain system 160. The engine 162 is considered to be in an OFF state when it is not rotating. The engine 162 is considered to be in an ON state when it is rotating. The all-cylinder state includes engine operation wherein all of the engine cylinders are activated by being fueled and fired. The cylinder deactivation state includes engine operation wherein one or a plurality of the engine cylinders are deactivated by being unfueled and unfired, and preferably operating with engine exhaust valves in open states to minimize pumping losses, while the remaining cylinders are fueled and fired and thus producing torque. The ON state may include the FCO state in which the engine 162 is spinning and unfueled. The ON state may include the cylinder deactivation state. The ON state may include the FCO state in combination with the cylinder deactivation state. Engine mechanizations and control routines for executing engine stop-start, FCO and cylinder deactivation control routines are known and not described herein. Engine operation may be described in context of engine operation states, including an engine operation state, an engine fueling state and an engine cylinder state. The engine operation states preferably include the ON and the OFF state. The engine fueling states include the fueled state and the FCO state. The engine cylinder states include the all-cylinder state and the cylinder deactivation state.

The electric machine, when employed, may be rotatably coupled to either the engine 162 or the geartrain 164 via a mechanical connection such as a belt/pulley connection or meshed gears. The electric machine may include a multi-phase electric motor/generator and associated inverter that are configured to convert stored electric energy to mechanical power and convert mechanical power to electric energy that may be stored in a DC power source (not shown). Alternatively, another non-combustion torque machine, such as a pneumatically-powered device or a hydraulically-powered device may be employed in place of the electric machine. By way of definition, a non-combustion torque machine is any device capable of generating torque by converting a potential energy source to kinetic energy without combustion of the potential energy. Non-limiting examples of the potential energy source may include electric energy, pneumatic energy and hydraulic energy. Pneumatically-powered devices and hydraulically-powered devices are known and not described in detail herein.

The geartrain 164 may include any suitable gear reduction/torque multiplication device for transferring torque between the engine 162 and the driveline 166. In one embodiment, the geartrain 164 may be arranged in a step-gear configuration, and may include one or more differential gearsets and activatable clutches that are arranged to effect torque transfer in one of a plurality of fixed gear states over a range of speed ratios. Alternatively, the geartrain 164 may be configured as a manual transmission, a continuously-variable transmission or CVT device, a dual-clutch transmission or DCT device, or another suitable arrangement. Furthermore, the geartrain 164 may include a flywheel, a torque converter and other torque management devices.

The driveline 166 preferably includes a differential gearset that is coupled to at least one driveshaft member that is coupled to a corresponding one of the front and/or rear vehicle wheels 170, 172. The driveline 166 is disposed to transfer propulsion power between the geartrain 164 and a surface of the roadway 192 via the vehicle wheels. The driveline 166 may be disposed in either a front-wheel drive configuration (as shown), a rear-wheel drive configuration, an all-wheel drive configuration or another suitable configuration. The driveline 166 is illustrative, and the concepts described herein apply to other drivetrain systems that are similarly configured. The concepts described herein may apply to any suitable configuration that includes an embodiment of the geartrain 164 that is disposed to transfer propulsion power between the engine 162 and the driveline 166.

The PCM 165 communicates with and is operatively connected to the drivetrain system 160, and executes control routines to control operation of the engine 162, the geartrain 164 and other devices to transmit tractive torque to the vehicle wheels 170, 172 in response to vehicle operating conditions and operator inputs. The PCM 165 is shown as a single control module, but can include a plurality of controller devices operative to control various drivetrain actuators, including the engine 162, geartrain 164, and other powertrain system devices. The PCM 165 may include control routines in the form of algorithmic code and associated calibrations to operate the engine 162 and geartrain 164 to control vehicle acceleration in response to operator control inputs that are detected via a human-machine interface (HMI) controller 124.

The spatial monitoring system 116 includes a controller that communicates with sensing devices to monitor remote objects that are proximate to the vehicle 101. A remote object is said to be proximate to the vehicle 101 when the remote object can be detected by one or more of the sensing devices. The spatial monitoring system 116 preferably determines a linear range, relative speed, and trajectory of each proximate remote object and communicates such information using the communication controller 19. The sensing devices are situated on the vehicle 101, and may include front corner sensors 121, rear corner sensors 120, rear side sensors 120', side sensors 129, a front radar sensor 122 and a camera 123 in one embodiment, although the disclosure is not so limited. Preferably the camera 123 includes a monochrome vision camera used for detecting forward lane markings, and other items. The front radar sensor 122 preferably includes a long-range radar device for object detection in front of the vehicle 101. The front radar sensor 122 preferably detects objects at a distance up to 200 m with a narrow field of view angle of around 15° in one embodiment. Due to the narrow field of view angle, the long range radar may not detect all objects in the front of the vehicle 101. The front corner sensors 121 preferably include short-range radar devices to assist in monitoring the region in front of the vehicle 101, each having a 60° field of view angle and 40 m detection range in one embodiment. The side sensors 129, rear corner sensors 120 and rear side sensors 120' preferably include short-range radar devices to assist in monitoring oncoming traffic beside and behind the vehicle 101, each having a 60° field of view angle and 40 m detection range in one embodiment. Placement of the aforementioned sensors permits the spatial monitoring system 116 to monitor traffic flow including proximate vehicles and other objects around the vehicle 101. Data generated by the spatial monitoring system 116 may be employed to estimate vehicle parameters in relation to the roadway 192.

Alternatively, the sensing devices can include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other known camera/video image processors which utilize digital photographic methods to 'view' forward objects including one or more object vehicle(s). Such sensing systems are employed for detecting and locating objects in automotive applications and are useable with systems including adaptive cruise control, collision avoidance, pre-crash safety, and side-object detection.

The sensing devices are preferably positioned within the vehicle 101 in relatively unobstructed positions. It is also appreciated that each of these sensors provides an estimate of actual location or condition of an object, wherein said estimate includes an estimated position and standard deviation. As such, sensory detection and measurement of object locations and conditions are typically referred to as 'estimates.' It is further appreciated that the characteristics of these sensors are complementary, in that some are more reliable in estimating certain parameters than others. Sensors can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some sensors present parametric variances during operation, although overlapping coverage areas of the sensors create opportunities for sensor data fusion.

The vehicle monitoring system 115 preferably includes a plurality of on-board chassis monitoring sensing systems and devices for monitoring vehicle operation to determine vehicle motion states that are communicated to the communication bus 127. The vehicle motion states preferably include, e.g., vehicle speed, steering angle of the steerable front wheels 172, and yaw rate. The on-board chassis monitoring sensing systems and devices include inertial sensors, such as rate gyros and accelerometers. The vehicle monitoring system 115 estimates the vehicle motion states, such as longitudinal speed, yaw-rate and lateral speed, and estimates lateral offset and heading angle of the vehicle 101. The measured yaw rate is combined with steering angle measurements to estimate the vehicle state of lateral speed. The longitudinal speed may be determined based upon signal inputs from wheel speed sensors arranged to monitor each of the front wheels 172 and rear wheels 170. The vehicle monitoring system 115 generates signals associated with the vehicle motion states that can be monitored by other vehicle control systems for vehicle control and operation. On-board chassis monitoring sensing systems and devices for monitoring vehicle operation to determine vehicle motion states are known to those having ordinary skill in the art, and thus not described in detail herein.

The VCM 128 communicates with and is operatively connected to a plurality of vehicle operating systems and executes control routines to control operation thereof. The vehicle operating systems preferably include braking, stability control, and steering systems. The vehicle operating systems can also include other systems, e.g., HVAC, entertainment systems, communication systems, and anti-theft systems. The VCM 128 is shown as a single control module, but can include a plurality of controller devices operative to monitor systems and control various vehicle actuators.

The HMI controller 124 monitors operator inputs from on-vehicle devices such as an accelerator pedal and a brake pedal, among other operator inputs such as a steering wheel 108, and determines an output torque request based thereon. The output torque request is employed to determine an axle torque command, which is employed by the PCM 165 to control operation of the drivetrain system 160, including controlling operation of the engine 162, the geartrain 164 and other devices to transmit tractive torque to the vehicle wheels in response to vehicle operating conditions and operator inputs. The HMI controller 124 monitors operator requests and provides information to the operator including status of vehicle systems, service and maintenance information. The HMI controller 124 communicates with other controllers in the vehicle 101, either directly or via the communication bus 127. The HMI controller 124 and related elements such as the accelerator pedal and brake pedal are depicted as a unitary device for ease of description, but may be configured as a plurality of controllers and associated sensing devices that communicate in various forms in an embodiment of the system described herein.

The communication controller 19 includes a wireless telematics communication system capable of extra-vehicle communications, including communicating with a remotely located communication network 196 having wireless and wired communication capabilities. The communication controller 19 may include a wireless telematics communication system capable of extra-vehicle communications that includes short-range vehicle-to-vehicle (V2V) communication. Alternatively or in addition, the communication controller 19 has a wireless telematics communication system capable of short-range wireless communication to a handheld device 20, e.g., a cell phone, a satellite phone or another telephonic device. In one embodiment the handheld device 20 is loaded with a software application that includes a wireless protocol to communicate with the communication controller 19, and the handheld device 20 executes the extra-vehicle communication 198, including communicating with a remote server 199 via the communication network 196. The vehicle 101 may also include a global positioning system (GPS) 15 and a navigation system 17, which may be employed to define a geographic location of the vehicle 101. The GPS 15 and navigation system 17 provide information related to the roadway 192, including changes in direction and altitude.

In certain embodiments the IVHS 190 is configured to monitor locations, speeds and trajectories of a plurality of vehicles in relation to the roadway 192. In one embodiment, the vehicle 101 is configured to communicate with the communication network 196, including communicating between the IVHS 190 and the vehicle 101. This can include communicating geographic location, forward velocity and acceleration rate of one or more vehicles in relation to the vehicle 101. In one embodiment, the vehicle 101 is configured to communicate with the remote server 199 via the communication network 196. The GPS 15, the navigation system 17, the vehicle monitoring system 115 and the spatial monitoring system 116 individually or in combination, form a route monitoring system that collects information that may be analyzed and fused to determine a projected path for the vehicle 101 and determine a projected road load and a speed constraint for the vehicle 101 along its projected path.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, e.g., high-speed local area network communication bus 127, a wireless link or any other suitable communication link. Communication includes exchanging data signals in any suitable form, including, for example, electrical signals via a conductive medium, electromagnetic signals via air, optical signals via optical waveguides, and the like. Communication between controllers, and communication between controllers, actuators and/or sensors may be accomplished using a direct wired link, a networked communications bus link, a wireless link, a serial peripheral interface bus or any another suitable communications link. The data signals may include discrete, analog or digitized analog signals representing inputs from sensors, actuator commands, and communication between controllers. The term 'signal' refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Vehicle operation responsive to operator requests includes operating modes of acceleration, braking, steady-state running, coasting, and idling. The acceleration mode includes an operator request to increase vehicle speed. The braking mode includes an operator request to decrease vehicle speed. The steady-state running mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The coasting mode includes vehicle operation wherein vehicle speed is above a minimum threshold speed and the operator request to the accelerator pedal is at a point that is less than required to maintain the present vehicle speed. The idle mode includes vehicle operation wherein vehicle speed is at or near zero.

The drivetrain system 160 is operative in one of a plurality of modes, which may be selected and implemented during ongoing drivetrain operation to effect vehicle operations of acceleration, braking, steady-state running, coasting, and idling. The drivetrain operation may include an engine-only drive mode, with accompanying engine stop-start operations on a system that is so equipped. In various hybrid powertrain systems, other drivetrain modes may include an electric-only drive mode, a regenerative mode, and an engine/electric-assist drive mode, with accompanying engine stop-start operations. In the engine-only drive mode, the engine 162 is controlled to generate propulsion power.

Figure 2:
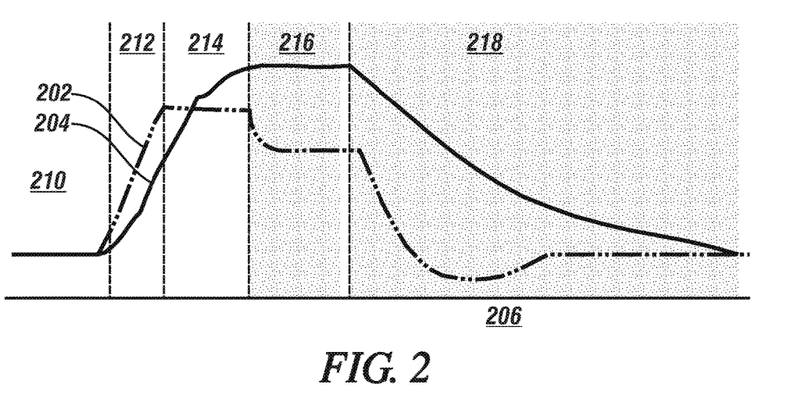
FIG. 2 graphically shows a plurality of engine operating zones corresponding to a plurality of vehicle operations, with engine power and vehicle speed shown on the vertical axis in relation to time on the horizontal axis, in accordance with the disclosure.

FIG. 2 graphically shows a plurality of engine operating zones corresponding to a plurality of vehicle operations, with engine power 202 and vehicle speed 204 shown on the vertical axis, in relation to time 206, which is shown on the horizontal axis. Zone 210 indicates an idle period, during which vehicle speed 204 is zero, and engine power 202 is at a minimum, e.g., either the engine 162 is operating at an idle state or is in an OFF state. Zone 212 indicates an initial acceleration period, during which vehicle speed 204 and engine power 202 are increasing in response to an output torque request. Zone 214 indicates a continuing acceleration period, during which vehicle speed 204 is increasing and engine power 202 is leveling off to a maximum state in response to an output torque request. Zone 216 indicates a steady-state or cruise operation, during which vehicle speed 204 is unchanged and engine power 202 is reducing, and leveling off at a reduced power state. Zone 218 indicates a coasting period, during which vehicle speed 204 is decreasing and engine power 202 is reducing to the minimum state in response to an output torque request. During engine operation in zone 212, there is a dearth of available engine power for driving one or more of the accessories, and commanding operation of one of the accessories may cause a reduction in vehicle acceleration. However, during engine operation in either zone 216 or zone 218, additional engine power may be available to power one or more of the accessories. Furthermore, increasing engine power demand during engine operation in either zone 216 or zone 218 may result in operating the engine 162 at a speed/load operating point that has improved efficiency.

Figure 3:
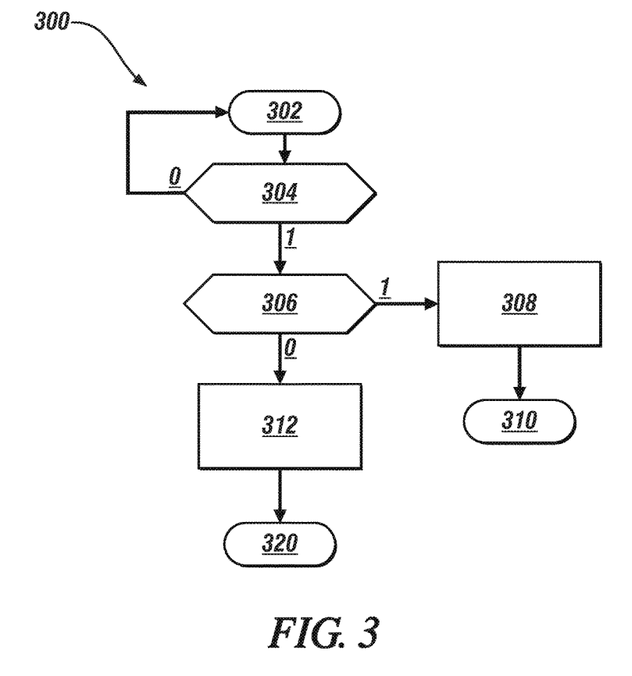
FIG. 3 shows a flowchart that depicts an accessory power management routine to control operation of an embodiment of the vehicle that is described with reference to FIG. 1, in accordance with the disclosure.

FIG. 3 schematically shows an accessory power management routine 300 to control operation of an embodiment of the vehicle 101 that is described with reference to FIG. 1. Table 1 is provided as a key wherein the numerically labeled blocks and the corresponding functions are set forth as follows, corresponding to the accessory power management routine 300. The accessory power management routine 300 relates to controlling each of a plurality of accessory devices that are disposed to transform power originating from the drivetrain 160 to effect some form of work. This preferably includes monitoring operation of the drivetrain 160 and an output torque request. A projected path and associated road load and speed constraint for the vehicle are determined and employed to determine a projected axle torque command that is responsive to an output torque request. An optimization routine is executed to determine a command for operating the accessory device that is balanced against a goal to minimize fuel consumption and meet the projected axle torque command. By way of non-limiting examples, the accessory devices may include the air conditioning compressor 148 and/or the electrically-powered radiator fan 146 that are described with reference to FIG. 1. Other accessory devices may include, by way of non-limiting examples, the front windshield heater 142, the rear window heater 144, and the PTC heater that is disposed to supply heated air to the passenger compartment of the vehicle 101.

TABLE 1

| BLOCK | BLOCK CONTENTS |
|---|---|
| 302 | Execute Routine |
| 304 | Monitor parameter associated with operation of accessory device; Is operation of accessory device requested? |
| 306 | Is limit for commanding operation of the accessory device achieved? |
| 308 | Determine desired accessory power Pd_acc and solve static optimization problem of Max[Eff(P_acc)] subject to |

TABLE 1-continued

| BLOCK | BLOCK CONTENTS |
|---|---|
|  | 1) To_axle remains constant |
|  | 2) P_acc ≥ Pd_acc |
|  | 3) V_veh ≤ V_constraint |
| 310 | Command accessory power to P_acc |
| 312 | Determine desired accessory power Pd_acc and solve dynamic optimization problem of Min[Fuel(P_acc(t)] subject to |
|  | 1) To_axle meets projected road load for horizon |
|  | 2) Accessory control parameter within limit |
| 320 | Command accessory power P_accf(0) |

Execution of the accessory power management routine 300 may proceed as follows. The steps of the accessory power management routine 300 may be executed in any suitable order, and are not limited to the order described with reference to FIG. 3. The accessory power management routine 300 may execute periodically, or in response to a triggering event (302), including monitoring a parameter that is associated with operation of an accessory device (304). By way of example, when the accessory device is the air conditioning compressor 148, the monitored parameter of interest may be ambient temperature in the passenger compartment. Other parameters related to operation of the drivetrain 160, including an output torque request, vehicle speed, an engine speed/load operating point are regularly determined.

When operation of one of the accessory devices is requested (304)(1), the routine 300 determines whether a parametric limit for commanding operation of the accessory has been reached (306)(1), or, alternatively, whether there is a possibility of delaying activation of the accessory device (306)(0). The parametric limit for commanding operation of the accessory device is specific to the accessory device and an associated parameter, and preferably is based upon some form of hysteresis and system response time. By way of example, when the accessory device is the air conditioning compressor 148, the parametric limit may be associated with a hysteresis temperature band for an operator-commanded ambient temperature for the passenger compartment.

When operation of an accessory device of interest is requested (304)(1), and a parametric limit for commanding operation of the accessory device has been reached (306)(1), i.e., there is a command to activate the accessory device, the routine 300 determines a desired accessory power (Pd_acc). The desired accessory power (Pd_acc) is determined by executing a second routine in the form of static optimization problem to determine an accessory power command P_acc that achieves a maximum efficiency while maintaining the axle torque command (To_axle) at a constant level, the accessory power command P_acc greater than or equal to the desired accessory power (Pd_acc), and the vehicle speed (V_veh) at or less than a speed constraint (V_constraint). The accessory power command P_acc is also referred to herein as a second command for operating the accessory device, wherein the second command for operating the accessory device is selected to achieve a maximum efficiency while maintaining the axle torque command at a constant level with the accessory power command greater than or equal to a desired accessory power. The static optimization problem may employ linear programming or another suitable optimization routine. The maximum efficiency is preferably based upon fuel efficiency, and may include vehicle-specific models, calibration tables, and equations that may be implemented and executed on-vehicle (308). The accessory device is commanded to operate in response to the accessory power command P_acc (310).

When operation of the accessory device of interest is requested (304)(1), and a parametric limit for commanding operation of the accessory has not been reached (306)(0), i.e., there is a possibility of delaying activation of the accessory device, an optimal accessory power command P_acc(t), which includes a commanded time-based trajectory for the accessory power that can be determined by solving a dynamic optimization problem that takes into account upcoming vehicle power demands using a time-based or mileage-based horizon, including determining a projected road load and a speed constraint for the time-based or mileage-based horizon and an associated projected axle torque command that is responsive to the projected road load and the speed constraint (312).

The dynamic optimization problem may employ dynamic programming to determine the optimal accessory power command P_acc(t) in one embodiment. Alternatively, the dynamic optimization problem may employ model predictive control to determine the optimal accessory power command P_acc(t) in one embodiment. Dynamic programming and model predictive control routines are known and not described herein. As used herein, the term "horizon" refers to a point in time or distance at which operation of the vehicle 101 can be projected using the spatial monitoring system 116, the vehicle monitoring system 115, and/or the IVHS 190. By way of non-limiting examples, the horizon may relate to operation of the vehicle 101 over the next mile, or over the next sixty seconds. Determining the projected road load and speed constraint for the vehicle 101 takes into account the time-based or mileage-based horizon for the vehicle 101 when traversing its projected path to determine the upcoming vehicle power demands, taking into account the output torque request and using information from the GPS 15, the navigation system 17, the vehicle monitoring system 115, the spatial monitoring system 116 and the IVHS 190 where and when available. The projected path is both predictive and adaptive, with information from the GPS 15, the navigation system 17 and the vehicle monitoring system 115 facilitating prediction of the projected path, and the vehicle monitoring system 115, the spatial monitoring system 116 and the IVHS 190 facilitating adaptation of the projected path in response to sensed changes during operation.

The optimal accessory power command P_acc(t) at time t is determined by executing a first routine in the form of dynamic optimization problem that finds a minimum fueling over the time-based or mileage-based horizon that takes into account a projected axle torque and achieves a parametric limit for the desired accessory power command P_acc(t) over the entire horizon. By way of example, when the accessory is the air conditioning compressor 148, the parameter of interest may be the ambient temperature in the passenger compartment and the parametric limit may be associated with a hysteresis temperature band for an operator-commanded temperature for the passenger compartment. The optimal accessory power command P_acc(t) is also referred to as a first command for operating the accessory device, and is determined to minimize fuel consumption and meet the projected axle torque command.

The projected axle torque command over the time-based or mileage-based horizon may be determined based upon inputs from a route monitoring system, which can include the global positioning system 15, the navigation system 17, the spatial monitoring system 116, the vehicle monitoring system 115, and/or the IVHS 190. The elements of the route monitoring system are disposed to determine a projected path for the vehicle 101. The projected axle torque command over the time-based or mileage-based horizon may be determined based upon inputs from the global positioning system 15 and the navigation system 17, which can be employed to determine and project the road load and speed constraint, and adapt to any related changes in either or both the road load and the speed. The projected axle torque command over the time-based or mileage-based horizon may be adapted based upon locations, speeds and trajectories of a plurality of vehicles in relation to the roadway 192, and roadway conditions such as upcoming traffic signals, etc., as determined from inputs from the IVHS 190. The projected axle torque command over the time-based or mileage-based horizon may also be adaptively determined based upon inputs from the spatial monitoring system 116 and the vehicle monitoring system 115, which may also provide information related to locations, speeds and trajectories of a plurality of vehicles in relation to the vehicle 101. The accessory device is commanded to operate in response to the optimal accessory power command P_acc(t) (320).

The process 300 is depicted as a flow chart illustrating an example method of a vehicle computing system receiving instructions from one or more controllers in communication with the system. The vehicle computing system communicating with one or more controllers may be implemented through a computer algorithm, machine executable code, non-transitory computer-readable medium, or software instructions programmed into a suitable programmable logic device(s) of the vehicle 101. Although the various steps shown in the flowchart diagram may appear to occur in a chronological sequence, at least some of the steps may occur in a different order, and some steps may be performed concurrently or not at all. The teachings may be described herein in terms of functional and/or logical block components and/or various processing steps. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The concepts described herein provide an ability for a vehicle controller to leverage static information found in maps, such as the presence of traffic signals, and dynamic information available through connectivity, such as the status of a traffic signal, before a vehicle reaches an intersection. As such, the powertrain control system can include operation that is predictive in nature and also adapts changes in circumstances. The predictive capability will enable the vehicle (and the driver) to not only react to the current needs but also efficiently plan for expected future needs. A supervisory controller can incorporate all the available information through connectivity and on-board sensors into an upper-level optimizer which determines the most fuel-efficient vehicle operation. The upper-level optimizer outputs brake, steering, speed, and torque requests to the lower-level controllers—vehicle chassis controller and powertrain (i.e., engine, transmission) controller. The lower-level controllers, in turn, perform local optimization and send out actuation commands. In particular, the powertrain controller proactively seeks the opportunities, within the constraints of emissions, passenger comfort and drivability, to execute the most fuel-efficient powertrain operations including, but not limited to, running at sweet spots, aggressive deceleration fuel cutoff, aggressive engine stop-start, aggressive cylinder deactivation, smart transmission shift, smart accessory load management, and smart thermal management.

As such, fuel efficiency may be improved by optimizing powertrain operation taking into account inter-vehicle connectivity, intelligent highway information and vehicle automation. Reaching the powertrain control level beyond vehicle-level only consideration allows the drivetrain, i.e., the engine and transmission to operate more efficiently while still supplying the required torque to propel the vehicle. It is also important to point out that the proposed control technologies apply to the operation of a single vehicle in isolation as well as to the operation of the same vehicle in a group of collaborating vehicles.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A vehicle, comprising:
a drivetrain system including an internal combustion engine and a geartrain, wherein the geartrain is disposed to transfer power originating from the internal combustion engine to vehicle wheels;
an accessory device being disposed to transform power originating from the drivetrain;
a route monitoring system disposed to determine a projected path for the vehicle; and
a controller, in communication with the powertrain system, the accessory device and the route monitoring system, the controller including a processor and memory including an instruction set, the instruction set executable to:
monitor a parameter associated with operation of the accessory device,
monitor a request to operate the accessory device, and
when the request to operate the accessory device includes a request to activate the accessory device based upon not exceeding a limit for the parameter that is associated with the operation of the accessory device:
determine a horizon for the vehicle based upon the projected path for the vehicle,
determine a projected road load and a speed constraint based upon the horizon for the vehicle,
determine a projected axle torque command based upon the projected road load and the speed constraint;
execute a first routine to determine a first command for operating the accessory device, wherein the first command for operating the accessory device is determined to minimize fuel consumption and meet the projected axle torque command; and
command operation of the accessory device based upon the first command.

2. The vehicle of claim 1, wherein the first routine includes a dynamic programming routine to determine the first command for operating the accessory device, wherein the first command for operating the accessory device is determined to minimize fuel consumption and meet the projected axle torque command.

3. The vehicle of claim 1, wherein the first routine includes a model predictive control routine to determine the first command for operating the accessory device, wherein the first command for operating the accessory device is determined to minimize fuel consumption and meet the projected axle torque command.

4. The vehicle of claim 1, wherein the first command for operating the accessory device is determined to minimize fuel consumption and meet the projected axle torque command over the horizon for the vehicle that is based upon the projected path for the vehicle.

5. The vehicle of claim 1, wherein the route monitoring system can include one or more of a global positioning system, a navigation system, an on-vehicle spatial monitoring system and a vehicle monitoring system.

6. The vehicle of claim 1, wherein the route monitoring system can include vehicle-to-vehicle communication system.

7. The vehicle of claim 1, wherein the route monitoring system can include an intelligent vehicle highway system.

8. The vehicle system of claim 1, wherein the horizon for the vehicle comprises an elapsed time at which operation of the vehicle can be projected.

9. The vehicle system of claim 1, wherein the horizon for the vehicle comprises an elapsed distance at which operation of the vehicle can be projected.

10. The vehicle of claim 1, further comprising, when the request to operate the accessory device includes a request to activate the accessory device based upon exceeding the parametric limit associated with operation of the accessory device:
the instruction set including a second routine executable to determine a second command to operate the accessory device, wherein the second command is selected to achieve a maximum efficiency while maintaining an axle torque command at a constant level with the accessory power command greater than or equal to a desired accessory power.

11. The vehicle of claim 10, wherein the second routine includes a static optimization routine that is executable to determine the second command for operating the accessory device that achieves a maximum efficiency while maintaining the axle torque command at the constant level with the accessory power command greater than or equal to the desired accessory power.

12. A vehicle, comprising:
a drivetrain system including an internal combustion engine and a geartrain, wherein the geartrain is disposed to transfer power originating from the internal combustion engine to vehicle wheels;
an accessory device coupled to the internal combustion engine;
a route monitoring system disposed to determine a projected path for the vehicle; and a controller, in communication with the powertrain system, the accessory device and the route monitoring system, the controller including a processor and memory including an instruction set, the instruction set executable to:
monitor a parameter associated with operation of the accessory device,
monitor a request to operate the accessory device,
when the request to operate the accessory device includes a request to activate the accessory device based upon not exceeding a limit for the parameter that is associated with the operation of the accessory device:
determine a horizon for the vehicle based upon the projected path for the vehicle, wherein the horizon for the vehicle comprises an elapsed time at which operation of the vehicle can be projected,
determine a projected road load and a speed constraint based upon the horizon for the vehicle,
determine a projected axle torque command based upon the projected road load and the speed constraint; and
execute a first routine to determine a first command for operating the accessory device, wherein the first command for operating the accessory device is determined to minimize fuel consumption and meet the projected axle torque command, and
when the request to operate the accessory device includes a request to activate the accessory device based upon exceeding the limit for the parameter that is associated with operation of the accessory device:
execute a second routine to determine a second command for operating the accessory device, wherein the second command for operating the accessory device is selected to achieve a maximum efficiency while maintaining the axle torque command at a constant level with the accessory power command greater than or equal to a desired accessory power.

13. The vehicle of claim 12, further comprising the instruction set executable to command operation of the accessory device based upon the first command.

14. A method for operating an accessory device of a vehicle including a drivetrain system having an internal combustion engine and a geartrain, wherein the geartrain is disposed to transfer power originating from the internal combustion engine to vehicle wheels, and wherein the vehicle includes a route monitoring system being disposed to determine a projected path for the vehicle, the method comprising:
monitoring via a controller a parameter associated with operation of the accessory device,
monitoring a request to operate the accessory device, and
when the request to operate the accessory device includes a request to activate the accessory device based upon not exceeding a limit for the parameter that is associated with the operation of the accessory device:
determining a horizon for the vehicle based upon the projected path for the vehicle,
determining a projected road load and a speed constraint based upon the horizon for the vehicle,
determining a projected axle torque command based upon the projected road load and the speed constraint,
executing a first routine via the controller to determine a first command for operating the accessory device, wherein the first command for operating the accessory device is determined to minimize fuel consumption and meet the projected axle torque command, and
commanding, via the controller, operation of the accessory device based upon the first command.

15. The method of claim 14, wherein executing the first routine includes executing a dynamic programming routine to determine the first command for operating the accessory device, wherein the first command for operating the accessory device is determined to minimize fuel consumption and meet the projected axle torque command.

16. The method of claim 14, wherein executing the first routine includes executing a model predictive control routine to determine the first command for operating the accessory device, wherein the first command for operating the accessory device is determined to minimize fuel consumption and meet the projected axle torque command.

17. The method of claim 14, wherein the first command for operating the accessory device is determined to minimize fuel consumption and meet the projected axle torque command over the horizon for the vehicle that is based upon the projected path for the vehicle.

18. The method of claim 14, further comprising, when the request to operate the accessory device includes a request to activate the accessory device based upon exceeding the parametric limit associated with operation of the accessory device:
executing a second routine to determine a second command for operating the accessory device, wherein the second command for operating the accessory device is selected to achieve a maximum efficiency while maintaining an axle torque command at a constant level with the accessory power command greater than or equal to a desired accessory power; and
commanding operation of the accessory device based upon the second command.

19. The method of claim 18, wherein the second routine includes a static optimization routine that is executable to determine the second command for operating the accessory device that achieves a maximum efficiency while maintaining the axle torque command at the constant level with the accessory power command greater than or equal to the desired accessory power.

* * * * *